H. J. SAWYER & E. W. WRIGHT.
Hardening and Correcting Circular Metal-Cutter.
No. 220,432.        Patented Oct. 7, 1879.
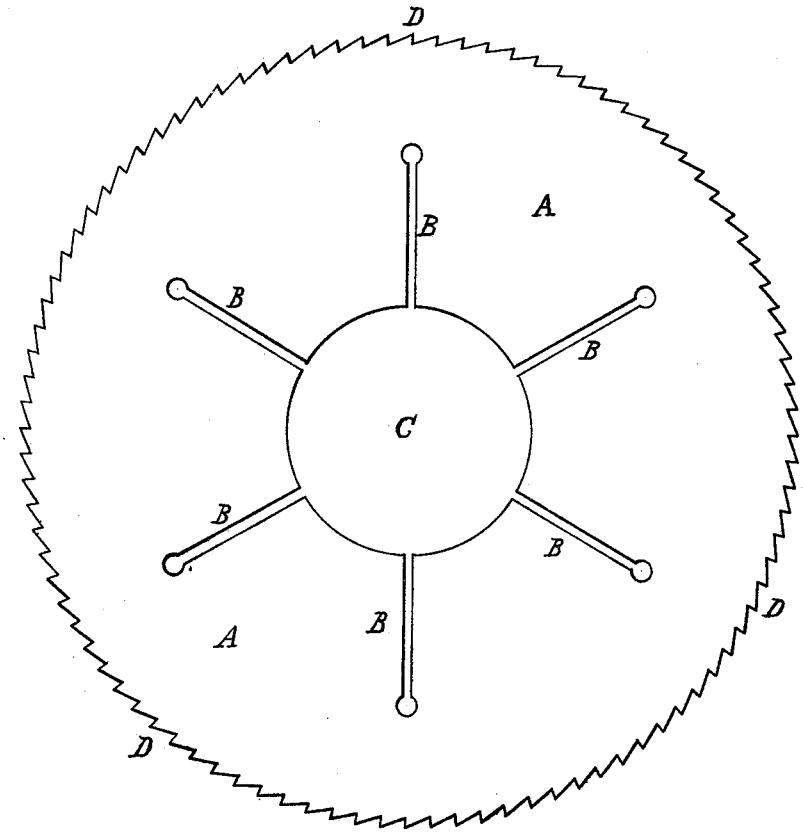
Witnesses-
Charles R. Hussey,
George W. Searle.
Inventors-
Hamilton J. Sawyer
& Edward W. Wright
By Albert M. Moore,
Their Attorney.

UNITED STATES PATENT OFFICE.

HAMILTON J. SAWYER AND EDWARD W. WRIGHT, OF LOWELL, MASS.

IMPROVEMENT IN HARDENING AND CORRECTING CIRCULAR METAL-CUTTERS.

Specification forming part of Letters Patent No. 220,432, dated October 7, 1879; application filed April 14, 1879.

*To all whom it may concern:*

Be it known that we, HAMILTON J. SAWYER and EDWARD W. WRIGHT, both of Lowell, in the county of Middlesex and Commonwealth of Massachusetts, have invented a new and useful Process of Hardening and Correcting Circular Steel Cutters for Cutting Metal and other hard substances, of which the following is a specification.

This process relates to that class of processes employed to correct the warping of such thin circular cutters as require fire-hardening, in first slotting said cutters, then hardening the teeth of the same only, and, lastly, stretching the metal of said cutters at or near the ends of the slots formed in the same.

The accompanying drawing represents one face of such a cutter, both faces of the same being alike.

Our invention may be better understood after a brief explanation of the method now in common use of making similar thin cutters, which method is to take a thick blank, formed with cutting-teeth and central eye, (to receive the arbor which carries the cutter,) and harden said blank throughout, and then, at considerable expense of time, labor, and emery or other grinding material, to grind out the inequalities produced by warping in the process of hardening, and thus to make the cutter true (on its faces) and, necessarily, thinner. By this method, the cutter, if very much warped in hardening, may have after grinding a greater diameter in one direction than in another.

Cutters for cutting metal require to be so hard that if hardened throughout they cannot subsequently be hammered or pressed to correct the warping without being broken. Very thick cutters do not warp so much, and can be made in the method above described.

Now, in carrying out our invention, we take a thin cutter—that is, a cutter of the thickness required in the finished cutter—provided with cutting-teeth and a central eye, as usual, and in this thin blank or cutter we make radial slots B, (say, about eight in number,) extending from the central eye C to as great a length as is consistent with having between the outer ends of the slots B and the periphery of the cutter A sufficient metal left to bear the strain upon the teeth when doing their work without breaking the cutter. The object of these slots is to facilitate the subsequent operation of correcting the cutter by stretching the metal of the same.

We then harden our cutter in the teeth only, leaving the rest of the cutter soft, so that the metal of the cutter within the fire-hardened periphery may subsequently be stretched.

Our method of hardening the cutter is to cover the same, with the exception of the teeth, with thick circular metallic plates, (one on each face,) closely fitting the faces of the cutter, and bolted together through the eye C, and then to subject the cutter and plates to a sufficient heat, and then to dip the cutter and plates in the water or other hardening liquor. On removing the cutter from between the plates after hardening it will invariably be found to be warped, two opposite edges of the same being curled upward, so that the cutter resembles in shape the rim of a silk hat.

Lastly, having placed the cutter on an anvil, by hammering said cutter at or near the outer ends of the slots B, we stretch the metal of the cutter, and to some extent drive said metal into the slots, and thereby gradually restore the cutter to its original form and correct the warping.

The metal of the cutter may be stretched by pressure applied at the required points, as by means of a press, instead of by hammering. Any slight deviation from truth in the cutter so made, after the same has been placed on its arbor, can be corrected by light blows with a hammer, the blows to be applied to the soft parts of the cutter, between the teeth and the central eye.

By our method we avoid the danger of breaking the cutter in correcting the same and the trouble and expense of grinding it true after hardening.

We claim as our invention—

The process of hardening and correcting said cutters by first slotting the same, then hardening the edges thereof only, and, lastly, stretching the metal of said cutters at or near the outer ends of the slots, substantially as herein described.

HAMILTON J. SAWYER.
EDWARD W. WRIGHT.

Witnesses:
ALBERT M. MOORE,
JAMES F. GORDON.